(12) United States Patent
Krishnamurthy

(10) Patent No.: US 6,732,232 B2
(45) Date of Patent: May 4, 2004

(54) ADAPTIVE RESOURCE ALLOCATION IN MULTI-DRIVE ARRAYS

(75) Inventor: Vikram Harakere Krishnamurthy, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 09/994,401

(22) Filed: Nov. 26, 2001

(65) Prior Publication Data

US 2003/0101316 A1 May 29, 2003

(51) Int. Cl.$^7$ ............................................... G06F 12/00
(52) U.S. Cl. ........................... 711/114; 711/154; 711/6; 714/6
(58) Field of Search ...................... 711/114, 111, 112, 711/4, 154; 714/6, 7

(56) References Cited

U.S. PATENT DOCUMENTS

| | | | |
|---|---|---|---|
| 5,623,595 A | * 4/1997 | Bailey | 714/6 |
| 5,651,133 A | 7/1997 | Burkes et al. | 711/114 |
| 5,659,704 A | 8/1997 | Burkes et al. | 711/114 |
| 5,671,385 A | * 9/1997 | Jost | 711/4 |
| 5,805,788 A | 9/1998 | Johnson | 714/6 |
| 5,809,516 A | 9/1998 | Ukai et al. | 711/114 |
| 5,848,229 A | * 12/1998 | Morita | 714/7 |
| 6,092,215 A | * 7/2000 | Hodges et al. | 714/6 |
| 6,230,247 B1 | 5/2001 | Cannon et al. | 711/171 |
| 6,237,052 B1 | * 5/2001 | Stolowitz | 710/61 |
| 6,480,904 B1 | * 11/2002 | Kato et al. | 710/6 |

FOREIGN PATENT DOCUMENTS

JP 10326222 12/1998

OTHER PUBLICATIONS

Geist, et al., "An Analytic Treatment of the Relibility and Performance of Mirrored Disk Subsystems", ©1993, p. 442–45.*
Ng, et al., "Maintaining Good Performance in Disk Arrays Durring Failure Via Uniform Parity Group Distribution", ©1992 IEEE, p. 260–269.*
Holland, et al., "Fast, on–Line Failure Recovery in Redundant Disk Arrays", ©1993 IEEE, p. 422–430.*
IBM, *Non–Volatile Cache Storage Allocation Algorithm,* IBM Technical Disclosure Bulletin, Dec. 1995, pp. 39–41, Vol. 38 No. 12, USA.

* cited by examiner

*Primary Examiner*—Donald Sparks
*Assistant Examiner*—Brian R. Peugh
(74) *Attorney, Agent, or Firm*—Bracewell & Patterson LLP

(57) ABSTRACT

A method, apparatus, and program product applicable within a multi-drive data storage system for adaptively allocating data reconstruction resources. In accordance with the method of the present invention, responsive to a detected drive failure, a resource allocation manager periodically determines the number of pending host system processing requests. The determined number of pending host system processing requests is then compared to a predetermined threshold value. Finally, a number of processing resources are allocated to data reconstruction in accordance with the results of the comparison of the number of pending host system processing requests to the predetermined threshold.

21 Claims, 3 Drawing Sheets

ADAPTIVE RESOURCE ALLOCATION IN MULTI-DRIVE ARRAYS

BACKGROUND OF THE INVENTION

1. Technical Field

The present invention generally relates to disk array data storage systems, and in particular to a method and system for reconstructing data in response to a disk failure within a disk array data storage system. More particularly, the present invention relates to an efficient mechanism for allocating processing resources during data reconstruction operations.

2. Description of the Related Art

Disk array data storage systems are characterized as having multiple storage disk drives that are arranged and coordinated to form a single mass storage system. Three fundamental design criteria for such mass storage systems include: performance, cost, and data access availability. It is most desirable to produce data storage systems that have a low cost per storage unit, a high input/output performance, and a high data access availability. As utilized herein, "data access availability" is a measure of ease with which data stored within a mass storage system is accessed and the level of assurance of continued operation in the event of some system failure (e.g. a disk drive failure). Typically, data access availability is provided through the use of redundancy wherein data, or relationships among data, are stored in multiple locations.

Two of the most common means of implementing redundancy in a disk array storage system are "mirroring" and "parity striping." According to the mirror method, data is duplicated and stored on separate areas of the mass storage system. In a disk array, for example, an identical data set is provided on two physically distinct disk drives. The mirror method has the advantages of high performance and high data access availability due to its duplicative storage technique. However, the mirror method is also relatively expensive as it effectively doubles the cost of storing data.

In the second, or "parity striping" method, a portion of the storage area is utilized to store redundant data, but the size of the redundant storage area is less than the 1:1 ratio required for disk mirroring. For example, in a disk array having ten disks, parity striping may permit nine of the disks to be utilized for storing data with the remaining one being dedicated to storing redundant data. The parity striping method is advantageous because it is less expensive that the mirroring method, but it has lower performance and availability characteristics relative to mirroring.

For disk arrays employing either or both mirroring and parity striping, there exists the need to reconstruct data in the case of a disk failure. One such data reconstruction technique in set forth by Morita in U.S. Pat. No. 5,848,229, in which data reconstruction in response to a failed disk unit is described with respect to a parity striped system. The data reconstruction technique described by Morita, as well as other conventional data reconstruction techniques, fail to address the issue of allocation of processing resources that are shared between a host processing system and the devices and programs utilized to implement data reconstruction (referred to hereinafter as reconstruction agents).

Given the nature of the mirror and parity striped redundancy techniques traditionally utilized to provide data access availability, the speed of a data reconstruction operation is important. The faster a data reconstruction operation is performed, the less likely an interim failure on yet another disk will exposed the disk array to a complete failure. Consequently, there exists a need to maximize the processing resources provided to reconstruction agents while maintaining the disk array on-line. The present invention addresses such a need.

SUMMARY OF THE INVENTION

A method, apparatus, and program product applicable within a multi-drive data storage system for adaptively allocating data reconstruction resources are disclosed herein. In accordance with the method of the present invention, responsive to a detected drive failure, a resource allocation manager periodically determines the number of pending host system processing requests. The determined number of pending host system processing requests is then compared to a predetermined threshold value. Finally, a number of processing resources are allocated to data reconstruction in accordance with the results of the comparison of the number of pending host system processing requests to the predetermined threshold.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

This invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention. Although, the present invention will be described herein in terms of a particular system and particular components, one of ordinary skill in the art will readily recognize that this method and system will operate effectively for other components in a data processing system.

The present invention is directed to improving relative processing resource allocation in a multi-drive data storage system, such as a Redundant Array of Independent Disks (RAID). All redundant disk array systems share a need to reconstruct data when a disk in the redundant array fails and the data stored thereon must be replaced. Reconstruction of data on a failed redundant array disk is well-known in the art, and the faster it is performed, the less exposed the redundant array is to a complete failure due possibly to an interim disk failure. Disclosed herein is a method and system for adaptively allocating the processing resources associated with the operation of a multi-drive disk array between a host system (e.g. host processor in a RAID system) and a set of data reconstruction agents, which may include processing threads within a RAID controller, for example, utilized for performing data reconstruction on a spare drive.

Figure 1:
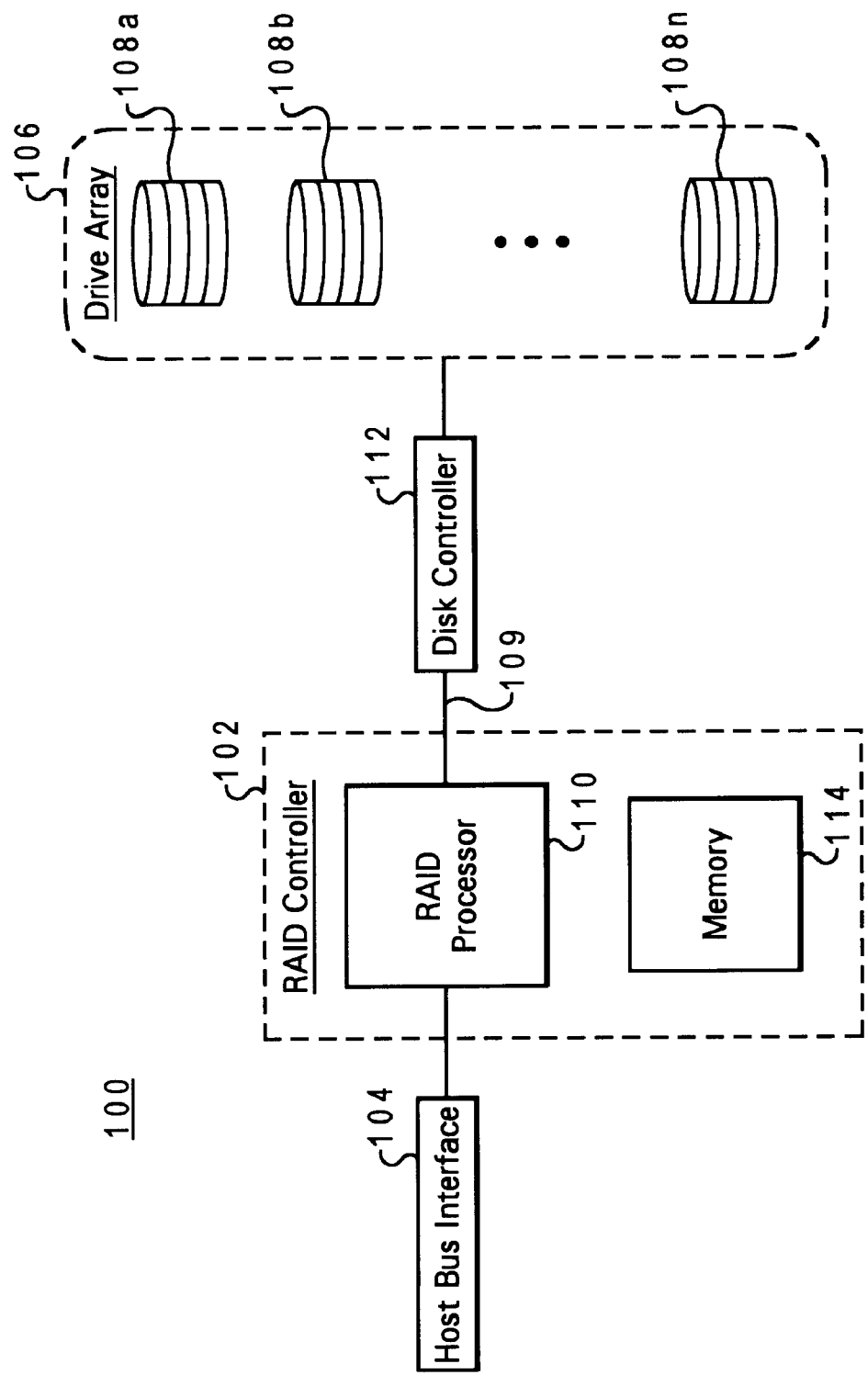
FIG. 1 depicts a multi-drive data storage system in which adaptive reconstruction resource allocation may be implemented in accordance with the present invention.

With reference now to the figures, wherein like reference numerals denote like and corresponding elements throughout, and in particular with reference to FIG. 1, there is depicted a multi-drive data storage system 100 in which adaptive reconstruction resource allocation in accordance with the present invention may be implemented. In the embodiment shown in FIG. 1, multi-drive data storage system 100 is a RAID system. RAID systems are among a well-known category of disk drive systems that utilize two or more drives in combination for performance and fault tolerance. RAID systems, such as multi-drive data storage system 100, are frequently employed in server applications.

As depicted in FIG. 1, multi-drive data storage system 100 includes a RAID controller 102 and a disk drive array 106. RAID controller 102 receives host system requests from a host processing system (not depicted in FIG. 1) via a host bus interface 104. Such requests include data transfer requests (e.g. READ/WRITE requests) for accessing data stored on a set of disk drives 108a–108n within drive array 106. Upon receipt from host bus interface 104, host system requests are processed within RAID controller 102 by a RAID processor 110, which delivers corresponding requests to drive array 106 via a local bus 109 and disk controller 112. In one embodiment, disk controller 112 is a Small Computer System Interface (SCSI) chip and associated circuitry that is responsible for controlling disk drives 108a–108n within drive array 106.

One or more forms of redundancy are employed by multi-drive data storage system 100 to ensure the reliability of data stored on disk drives 108a–108n. Specifically, RAID levels that employ either data mirroring or parity striping techniques may be utilized to maintain such redundancy. Both data mirroring (i.e. data duplicated and stored on separate drives) and parity striping (i.e. data distributed among several drives with a less than 1:1 ratio of reserved storage area for redundant data) enable recovery of data from a failed drive onto one or more spare drives. There are a variety of possible sources of drive failure including drive mechanism malfunction, power interruption, etc.

Responsive to one or more of disks drives 108a–108n failing, the data on the failed drive will be reconstructed on an available spare drive in accordance with whichever redundancy technique is utilized. In such a case, there is a competition between the host system requests currently being processed by RAID controller 102 and reconstruction agents within RAID controller 102 for processing resources such as memory and processing cycles. Reconstruction agents are typically processing threads (not depicted in FIG. 1) allocated by RAID processor 110. Random Access Memory (RAM) resources from an associated memory 114 within RAID controller 102 must be allocated in support of such data reconstruction processing threads. Conventionally, the relative allocation of memory and other processing resources between pending host system requests and a data reconstruction operation is a predetermined system parameter. For example, many conventional multi-drive array systems set aside a predetermined set of such resources dedicated to data reconstruction.

As explained in further detail with reference to FIGS. 2 and 3, multi-drive data storage system 100 implements an adaptive reconstruction resource allocation process that maximizes the processing resources available to data reconstruction agents in accordance with on-going host system request processing within RAID controller 102. In accordance with the adaptive resource allocation technique of the present invention, a drive failure communicated via disk controller 112 triggers RAID processor 110 to begin sampling the number of pending host requests received from host bus interface 104 at a predetermined time interval. RAID processor 110 utilizes the sampled host request values to determine how many processing resources, such as cycles on local bus 109 and memory allocation from RAID processor memory 114 may be allocated to the subsequent data reconstruction operation.

Figure 2:
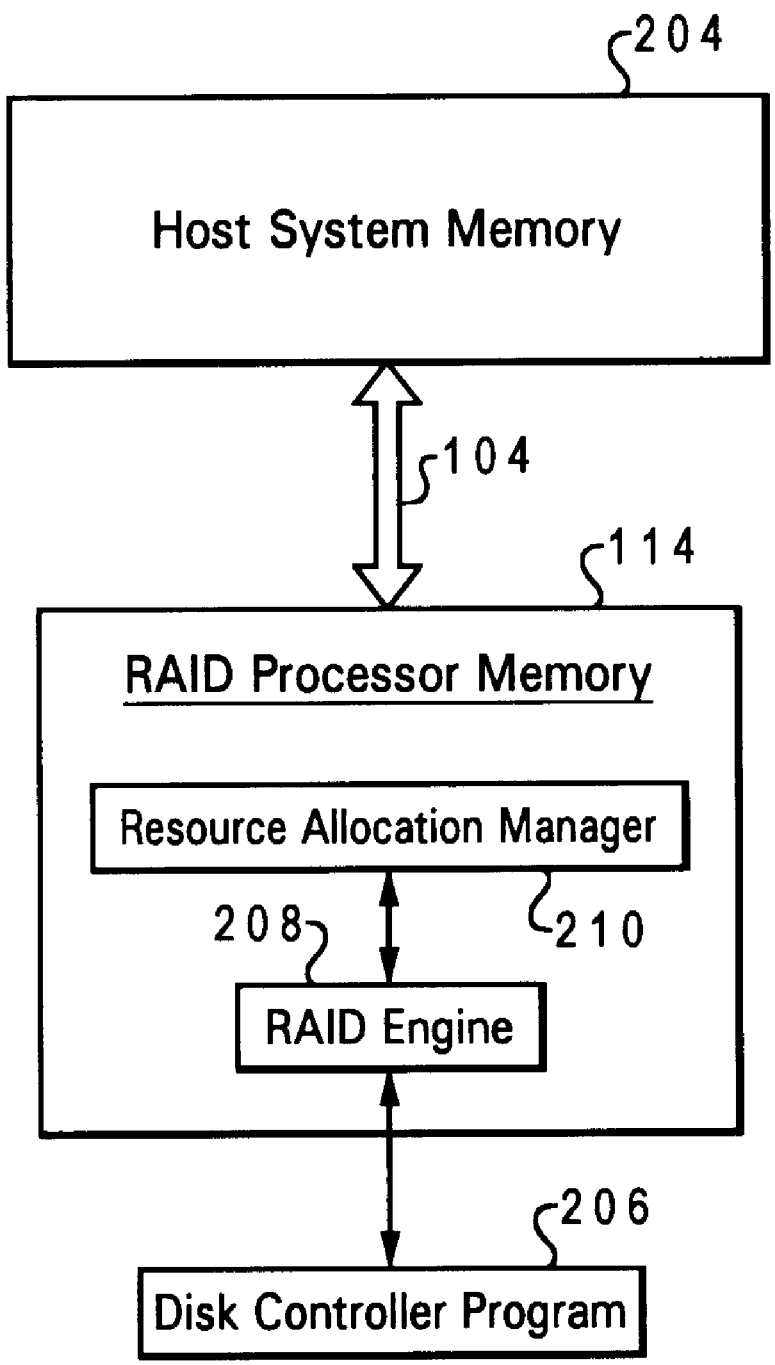
FIG. 2 is a block diagram illustrating software components utilized in implementing adaptive reconstruction resource allocation in the multi-drive data storage system shown in FIG. 1.

Referring to FIG. 2, there is depicted a block diagram of software components utilized in implementing adaptive reconstruction resource allocation in the multi-drive data storage system 100 illustrated in FIG. 1. As depicted in FIG. 2, a host system processor memory 204 stores requests formulated by a host system processor (not depicted), which are delivered via host bus interface 104 to RAID controller memory 114. Within RAID controller memory 114, a RAID engine 208 includes microcode instructions executed by RAID processor 110 during operation of multi-drive data storage system 100, including the processing of host system requests and communications to and from a disk controller program 206 that operates within disk controller 112.

In anticipation of a potential drive failure, RAID engine 208 periodically monitors the availability of a spare drive among disk drives 108a–108n to which a critical array can be reconstructed (as utilized herein, a "critical array" is a parity or mirror protected drive array that has lost use of one of its constituent disks). If the monitoring agent (thread within RAID engine 208) detects a qualifying critical array and also a qualifying spare drive among disk drives 108a–108n, it initiates a reconstruction operation. The nature of the reconstruction operation itself differs depending on the redundancy (e.g. RAID level) employed. For example, a mirrored RAID array is reconstructed by merely copying back the data units from the surviving disks in the critical array to corresponding locations on the spare drive array. This is in contrast to a reconstruction operation performed on a parity protected array, which entails additional operations for first generating the lost data units from the surviving disks and subsequently restoring them onto the spare disk at corresponding locations.

Any type of data reconstruction operation performed by RAID engine 208 will compete with pending host system requests for a shared set of processing resources. The present invention addresses this competition in light of the need to minimize the time required to complete a data reconstruction operation. To this end, a resource allocation manager program 210 is included within RAID controller memory 114 to enable dynamic allocation of processing resources between pending host processor requests and data reconstruction agents. Resource allocation manager 210 controls allocation of processing resources within RAID controller 102 by either increasing or decreasing the number of resources to be utilized for a given data reconstruction operation. The depiction in FIG. 2 of resource allocation manager 210 as distinct from RAID engine 208 is for illustrative purposes alone, since in many applications, resource allocation manager 210 may be incorporated as part of a RAID engine designed in accordance with the principles set forth herein.

As explained in further detail with reference to FIG. 3, responsive to a detected drive failure communicated from disk controller program 206, resource allocation manager 210 periodically samples the number of currently pending (new and outstanding) host processor requests delivered to RAID processor 110. The number of detected pending requests is then compared by resource allocation manager 210 with a predetermined threshold value. The result of this comparison is then utilized by resource allocation manager 210 to increase or decrease (or maintain static) the number of processing resources to be utilized by RAID engine 208 during a data reconstruction operation.

Figure 3:
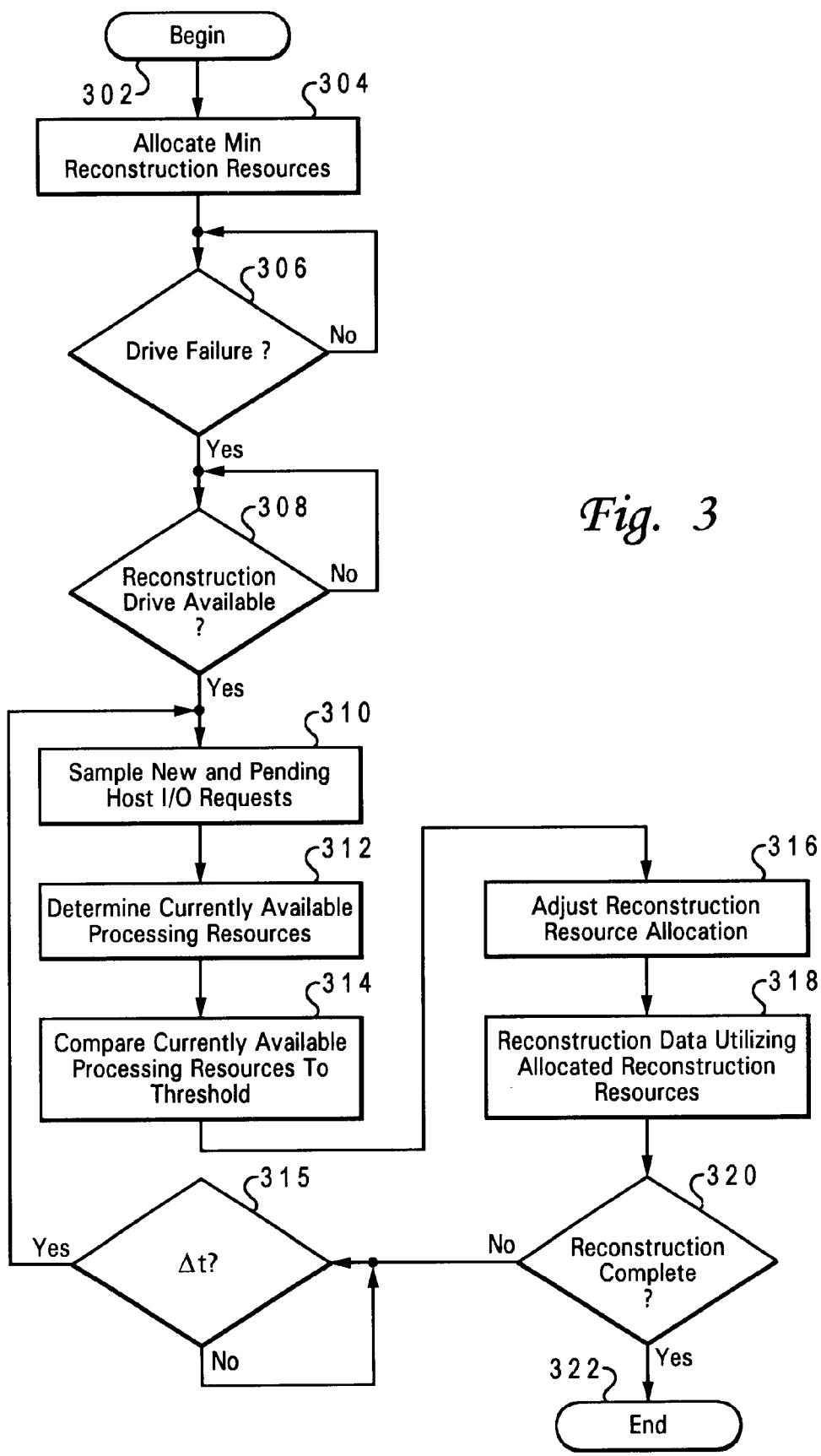
FIG. 3 is a flow diagram depicting steps performed by a reconstruction resource allocation program and RAID engine during adaptive reconstruction resource allocation in accordance with a preferred embodiment of the present invention.

With reference to FIG. 3, there is depicted a flow diagram illustrating steps performed by resource allocation manager 210 and RAID engine 208 during a data drive reconstruction employing the adaptive resource allocation process of the present invention. The adaptive resource allocation begins as shown at step 302 and continues as illustrated at step 304 with resource allocation manager 210 allocating a minimum set of processing resources to be reserved for data reconstruction operations performed by RAID engine 208.

In accordance with an important feature of the present invention, and as depicted at steps 306 and 310, resource allocation manager 210 samples the number of pending host processor requests as evidenced by the content of RAID processor memory 114 (assuming a spare drive is available as shown at step 308). Next, as illustrated at step 312, resource allocation manager 210 effectively subtracts the minimum number of reserved reconstruction resources set at step 304 from the total processing resources that are disposed to RAID engine 208 to determine the subset of such resources that are commonly available for host request processing and data reconstruction.

The determined number of commonly available processing resources is then compared to a predetermined threshold number as shown at step 314. The predetermined threshold is a design determination that fundamentally serves to ensure that the on-line reliability of multi-drive data storage system is not unduly compromised by the adaptive allocation of data reconstruction resources. The criteria for setting the value of the predetermined threshold are not the subject of the present invention and are thus not described in detail herein.

Proceeding to step 316, resource allocation manager 210 utilizes the comparison performed at step 314 to adjust the number of processing resources within RAID controller 102, which are to be temporarily allocated for data reconstruction agents within RAID engine 208. Specifically, if resource allocation manager 210 determines that the number of pending requests does not exceed the predetermined threshold, resource allocation manager 210 increases the number of processing resources available to RAID engine 208 dedicated to data reconstruction. Likewise, if resource allocation manager 210 determines that the number of pending requests exceeds the predetermined threshold, resource allocation manager 210 decreases the number of processing resources available to RAID engine 208 dedicated to data reconstruction. It should be noted that a downshift in the allocation of resources to reconstruction agents is limited to the preliminarily designated minimum set allocated at step 304.

The nature of the processing resource allocation adjustment performed at step 316 is determined by the nature of the data reconstruction agents employed by RAID engine 208. Typically, such reconstruction agents include processing threads within RAID engine 208, which are independently available instruction sets that may be incorporated in a multi-threaded or pipelined data reconstruction routine in accordance with the type of redundancy utilized by multi-drive data storage system 100. In such a case, the reconstruction resource allocation adjustment depicted at step 316 may entail increasing or decreasing the number of threads available for data reconstruction operations within RAID engine 208. Furthermore, the resource allocation adjustment may further include increasing or decreasing, in accordance with the results of the comparison depicted at step 314, the amount of memory storage available for reconstruction processing.

It should be noted that the sampling and subsequent adaptive resource allocation illustrated at steps 310, 312, 314, and 316, is performed periodically at a predetermined time and/or cycle count interval, $\Delta t$, such that when a drive failure occurs, maximum resources are allocated to data reconstruction without comprising the on-line operational reliability of multi-drive data storage system 100. As illustrated at step 318, the reconstruction agents commence restoring the data on from the failed drive utilizing the resource allocation (including allocation of the reconstruction agents themselves) as originally set and subsequently adjusted at steps 304 and 316, respectively.

As depicted at steps 320 and 315, prior to completion of the data reconstruction operation, steps 310, 312, 314, and 316 are repeated periodically (i.e. at a given time interval $\Delta t$) to provide maximum permissible resource allocation to the reconstruction operation. When the data on the failed drive has been restored (step 320) the data reconstruction process terminates as shown at step 322.

A method and apparatus have been disclosed for adaptively allocating error recovery resources within a multi-drive system. Software written according to the present invention is to be stored in some form of computer readable medium, such as memory, CD-ROM or transmitted over a network, and executed by a processor. Alternatively, some of all of the present invention could be implemented in hardware. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method applicable within a multi-drive data storage system for adaptively allocating data reconstruction resources, said method comprising:

responsive to a detected drive failure within said multi-drive data storage system, periodically determining a number of host system processing requests;

comparing said number of pending host system processing requests to a predetermined threshold; and allocating a number of data reconstruction resources in accordance with said comparison of said number of pending host system processing requests to said predetermined threshold.

2. The method of claim 1, wherein said comparing said number of pending host system processing requests to a predetermined threshold is followed by determining whether or not said number of pending host system processing requests exceeds said predetermined threshold.

3. The method of claim 2, wherein said allocating a number of data reconstruction agents comprises:

responsive to said number of pending host system processing requests not exceeding said predetermined threshold, increasing said number of allocated data reconstruction resources; and responsive to said number of pending host system processing requests exceeding said predetermined threshold, decreasing said number of allocated data reconstruction resources.

4. The method of claim 1, wherein said multi-drive data storage system is a RAID system including a host processor communicatively coupled to a RAID controller, said periodically determining a number of host system processing requests comprising determining the number of new and pending requests delivered from said host processor to said RAID controller.

5. The method of claim 1, wherein said multi-drive data storage system includes data reconstruction agents that facilitate data reconstruction in response to a drive failure within said multi-drive data storage system, said method further comprising reserving a minimum number of processing resources for said data reconstruction agents.

6. The method of claim 5, wherein said data reconstruction agents are processing threads, said allocating a number of data reconstruction resources further comprising increasing or decreasing the number of said data reconstruction processing threads in accordance with said comparison of said number of pending host system processing requests to said predetermined threshold.

7. The method of claim 6, wherein said allocating a number of data reconstruction resources further comprises increasing or decreasing memory availability for said allocated number of data reconstruction processing threads.

8. A multi-drive data storage system wherein data reconstruction resources are adaptively allocated, said multi-drive data storage system comprising:

processing means responsive to detecting a drive failure for periodically determining a number of host system processing requests;

processing means for comparing said number of pending host system processing requests to a predetermined threshold; and processing means for allocating a number of data reconstruction resources in accordance with said comparison of said number of pending host system processing requests to said predetermined threshold.

9. The multi-drive data storage system of claim 8, further comprising processing means for determining whether or not said number of pending host system processing requests exceeds said predetermined threshold.

10. The multi-drive data storage system of claim 9, further comprising:

processing means responsive to said number of pending host system processing requests not exceeding said predetermined threshold for increasing said number of allocated data reconstruction resources; and processing means responsive to said number of pending host system processing requests exceeding said predetermined threshold for decreasing said number of allocated data reconstruction resources.

11. The multi-drive data storage system of claim 8, wherein said multi-drive data storage system is a RAID system including a host processor communicatively coupled to a RAID controller, said processing means for periodically determining a number of host system processing requests comprising processing means for determining the number of new and pending requests delivered from said host processor to said RAID controller.

12. The multi-drive data storage system of claim 8, further comprising:

data reconstruction agents that facilitate data reconstruction in response to a drive failure within said multi-drive data storage system; and processing means for reserving a minimum number of processing resources for use by said data reconstruction agents.

13. The multi-drive data storage system of claim 12, wherein said data reconstruction agents are processing threads, said processing means for allocating a number of data reconstruction resources further comprising processing means for increasing or decreasing the number of said data reconstruction processing threads in accordance with said comparison of said number of pending host system processing requests to said predetermined threshold.

14. The multi-drive data storage system of claim 13, wherein said processing means for allocating a number of data reconstruction resources further comprises processing means for increasing or decreasing memory availability for said allocated number of data reconstruction processing threads.

15. A computer program product residing in a data storage medium for adaptively allocating data reconstruction resources, said computer program product comprising:

program code means responsive to a detected drive failure within said multi-drive data storage system for periodically determining a number of host system processing requests;

program code means for comparing said number of pending host system processing requests to a predetermined threshold; and program code means for allocating a number of data reconstruction resources in accordance with said comparison of said number of pending host system processing requests to said predetermined threshold.

16. The computer program product of claim 15, further comprising program code means for determining whether or not said number of pending host system processing requests exceeds said predetermined threshold.

17. The computer program product of claim 16, further comprising:

program code means responsive to said number of pending host system processing requests not exceeding said predetermined threshold for increasing said number of allocated data reconstruction resources; and program code means responsive to said number of pending host system processing requests exceeding said predetermined threshold for decreasing said number of allocated data reconstruction resources.

18. The computer program product of claim 15, wherein said data storage medium resides in a RAID system which includes a host processor communicatively coupled to a RAID controller, said program code means for periodically determining a number of host system processing requests comprising is program code means for determining the number of new and pending requests delivered from said host processor to said RAID controller.

19. The computer program product of claim 15, wherein said data storage medium includes data reconstruction agents that facilitate data reconstruction in response to a drive failure within said multi-drive data storage system, said computer program product further comprising program code means for reserving a minimum number of processing resources for use by said data reconstruction agents.

20. The computer program product of claim 19, wherein said data reconstruction agents are processing threads, said program code means for allocating a number of data reconstruction resources further comprising program code means for increasing or decreasing the number of said data reconstruction processing threads in accordance with said comparison of said number of pending host system processing requests to said predetermined threshold.

21. The computer program product of claim 20, wherein said program code means for allocating a number of data reconstruction resources further comprises program code means for increasing or decreasing memory availability for said allocated number of data reconstruction processing threads.

* * * * *